United States Patent

MacDonald

[15] 3,659,037
[45] Apr. 25, 1972

[54] ELECTRICAL OUTLET BOX

[72] Inventor: Robert D. MacDonald, Metamora, Mich.
[73] Assignee: Cardinal of Adrian, Inc., Adrian, Mich.
[22] Filed: Apr. 30, 1971
[21] Appl. No.: 139,058

[52] U.S. Cl. .......................... 174/58, 220/3.6, 248/DIG. 6, 248/27
[51] Int. Cl. .......................................... H02g 3/12
[58] Field of Search............... 174/58, 53, 153 G; 220/3.2, 220/3.3, 3.4, 3.5, 3.6, 3.9, 18; 248/27, DIG. 6

[56] References Cited

UNITED STATES PATENTS

| | | | |
|---|---|---|---|
| 982,193 | 1/1911 | Thayer | 220/3.4 |
| 1,519,927 | 12/1924 | Polhemus | 220/3.6 X |
| 2,044,650 | 6/1936 | Thompson | 220/3.6 |
| 3,097,259 | 7/1963 | McMillen et al. | 174/153 G |
| 3,176,869 | 4/1965 | Kinney | 174/58 X |
| 3,193,226 | 7/1965 | Showalter | 248/27 |
| 3,268,189 | 8/1966 | Ducharme | 220/3.3 |

FOREIGN PATENTS OR APPLICATIONS 730,452  5/1955  Great Britain ......................... 220/3.3

Primary Examiner—E. A. Goldberg
Assistant Examiner—D. A. Tone
Attorney—Cullen, Settle, Sloman & Cantor

[57] ABSTRACT

A molded plastic electrical outlet box has upper and lower mounting bosses which engage front and rear faces of the wall panel opening in which the box is installed, thereby temporarily but securely retaining the box in the wall opening. The same pair of screws which subsequently fix an electrical unit within the box also permanently and securely clamp the mounting bosses to the wall panel. Transverse nail guiding passages provide a means for additionally nailing the box to a stud if required by local building codes.

8 Claims, 8 Drawing Figures

PATENTED APR 25 1972

INVENTOR.
ROBERT D. MAC DONALD.
BY
CULLEN, SETTLE, SLOMAN & CANTOR.
ATT'YS.

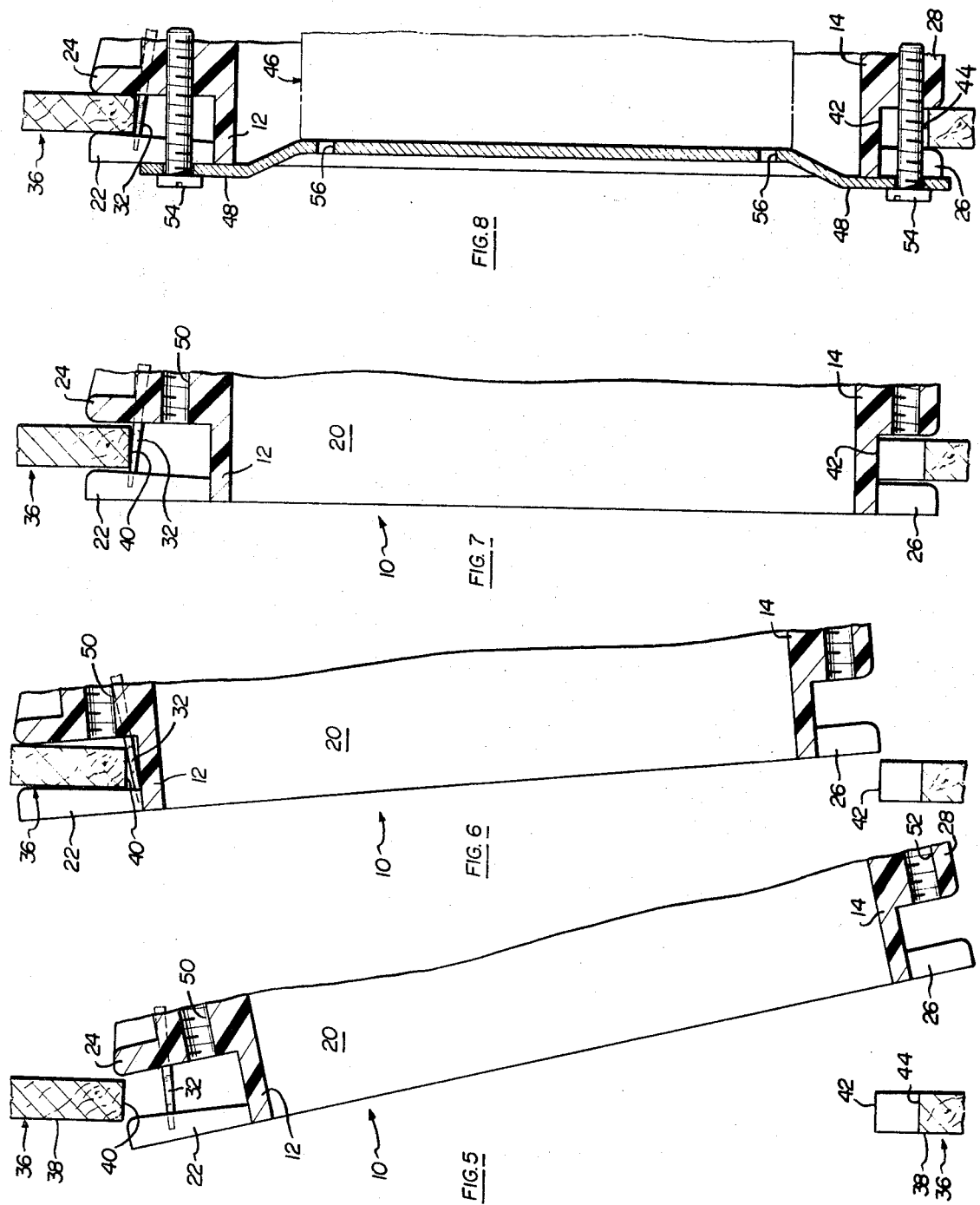

ELECTRICAL OUTLET BOX

BACKGROUND OF INVENTION

Electrical outlet boxes are flush mounted in walls for receiving conventional electrical units such as switches or plug receptacles. Such boxes are typically nailed or screwed into the wall so that their open front face is approximately flush with the face of the wall. Pre-weakened knock-out or punchout holes are formed in the side walls of the box, to permit entry of electrical wiring.

Once the outlet box is secured in the wall, the electrical unit is then screwed into the box. For this purpose, the front face of the electrical unit has projecting metal mounting straps with clearance holes for the screws, which pass through the straps into threaded receiving holes in the box. Thereafter, the entire assembly is covered over with a face plate usually screwed to the electrical unit.

In high production operations, particularly in the case of mobile homes which travel down an assembly line during construction, the above conventional practice has several disadvantages. First, a screw type installation operation is required at three separate stages: the installation of the outlet box to the wall, the mounting of the electrical unit within the box and the securing of the cover plate to the finished installation. Furthermore, in mobile home construction wherein building codes do not generally require that outlet boxes be secured to a stud, it is permissable to secure the outlet box to the wall facing surrounding it. On the moving assembly line, however, the preliminarily inserted outlet boxes tend to jiggle out of the wall panel opening unless they are promptly and firmly screwed into place. This is not always convenient in a high production assembly line type of operation.

Hence, it is a principal object of this invention to provide an inexpensive one-piece molded plastic electrical outlet box especially adapted for use in mobile home construction, and which has means to assure that it will remain in the wall panel opening prior to final completion of the installation. An additional object of this invention is to reduce the number of assembly operations required in the installation of the box in the wall and the subsequent securing of the electrical unit within the box.

These and other objects of the present invention will become apparent from the following specification and the accompanying drawings.

BRIEF DESCRIPTION OF THE DRAWINGS

FIGS. 5 through 8 are fragmentary side cross-sectional views similar to FIG. 4, but showing the sequence of steps involved in installing the outlet box into a wall opening and subsequently securing the electrical unit within the outlet box.

DETAILED DESCRIPTION OF THE INVENTION

Figure 1:
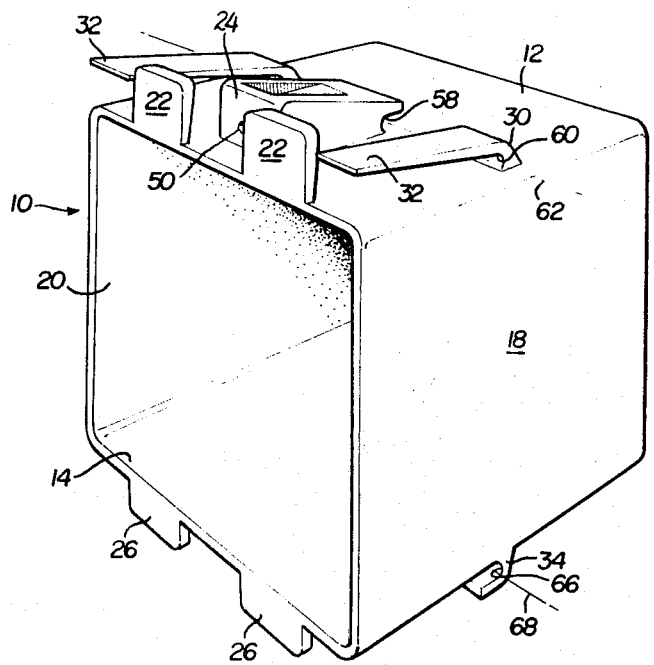
FIG. 1 is a perspective view of the improved electrical outlet box of this invention.
Figure 2:
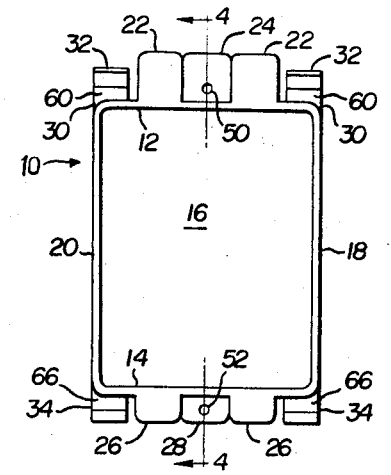
FIG. 2 is a front view into the open front end of the box of FIG. 1.

Referring in particular to FIGS. 1–4 of the drawings, there is shown a one-piece molded plastic electrical outlet box 10, generally comprising top wall 12, bottom wall 14, rear wall 16, and side walls 18 and 20. As is conventional, such walls of the box would be provided with knock-outs to provide access holes for electrical wiring at whatever point is required. Since such knock-outs are conventional and do not form a portion of this invention, they have not been illustrated.

Top wall 12 has a pair of integrally molded laterally spaced front bosses or tabs 22 and a rearward boss 24 positioned between but behind front bosses 22. A substantially symmetrical arrangement is similarly provided on bottom wall 14 of box 10, comprising a pair of front bosses 26 and a rearward bottom boss 28.

Top wall 12 is further provided with a pair of side nail guiding bosses 30, from which extend forwardly resilient spring arms 32. Bottom wall 14 is similarly provided with a pair of side nail guiding bosses 34, but no corresponding spring arms are required.

As best seen in FIG. 5, electrical outlet box 10 is adapted to be inserted in wall panel 36, having a front face 38, an upper opening edge 40 and a lower opening edge 42. A small scallop or groove 44 is provided in lower edge 42 of the opening, for a purpose which will be described below.

Wall panel 36 represents one face of a double faced wall, which would typically comprise a series of framing members such as two-by-four's, both faces of which would be covered with a facing such as wall panel 36. In the case of mobile homes, wall panel 36 may comprise ⅛ inch or 3/16 inch plywood. The open front face of outlet box 10 is intended to lie approximately flush with front face 38 of wall panel 36, with the body of the box lying in the space between the opposed wall panels of the double faced wall, as is conventional.

The technique of preliminarily installing outlet box 10 in the opening in wall panel 36 is shown in a series of sequential steps illustrated in FIGS. 5–8.

By way of example only, it is useful to indicate the approximate dimensions of a typical installation, since certain of these dimensions are significant in achieving the objectives of this invention. For a wall opening having a width of 2 and 7/16 inches and a height of 3 and 5/16 inches, the width of box 10 may be 2 and ⅜ inches; the height from the upper face of top wall 12 to the lower face of bottom wall 14 may be 3 inches; the height of upper bosses 22 and 24 may be one-half an inch; and the height of lower bosses 26 and 28 may be one-quarter inch; and the overall depth of the box may be 2 ¾ inch.

The installation of the box requires that it be inserted from the rear of the opening. If the wall has not been completely assembled, this can be readily accomplished. Otherwise, the box can be passed through the wall opening with its open front face either downward or upward.

Comparing FIGS. 5 and 6, it will be seen that the box is initially tilted forwardly at the top and lifted until the upper surface of top wall 12 abuts the upper edge 40 of the wall opening. In so doing, resilient spring arms 32 are depressed by the edge 40 of the wall opening.

Once the box has been placed in the position shown in FIG. 6, the lower portion of the box can be rocked forwardly, since lower front bosses 26 can clear the lower edge 42 of the wall opening. Then the box is lowered until bottom wall 14 is resting on lower edge 42 of the wall opening. It can be seen that the box cannot be removed from the wall opening while it is in the position shown in FIG. 7, since there remains an interference or overlap between upper front and rear bosses 22 and 24 and the upper edge 40 of the wall opening. As long as bottom wall 14 of the box is resting on lower edge 42 of the wall opening, the box cannot be removed from the opening.

The purpose of resilient spring arms 32 will now be appreciated. As shown in FIG. 7, spring arms 32 are deflected downwardly slightly by their engagement with upper edge 40 of the wall opening. This downward deflection of resilient spring arms 32 create a downward force on the entire box, thus assuring that it remains seated on lower edge 42 of the wall opening. In spite of any jiggling that may occur as a mobile home, for example, travels down an assembly line, the outlet box 10 will not fall out of the wall opening. This is true, in spite of the absence of any nails or screws holding it in place at this stage of assembly.

It will also be apparent that the above described method of installation is the only way that a box so dimensioned can be installed. Thus, if the first step of an attempted installation were to seat bottom wall 14 on lower edge 42 of the wall opening, there would still be an interference between the upper edge of upper front boss 22 and the upper edge 40 of the wall opening, preventing complete insertion of the box. Since upper bosses 22 are longer or higher than lower bosses 26, the box can only be installed by the sequence shown in FIGS. 5 through 7.

The installation of an electrical unit 46 such as a plug receptacle or switch, will now be described. The electrical unit 46 is shown in phantom in FIG. 8, since its particular nature and dimension is not significant. Such units are typically provided with a pair of metal mounting or securing straps 48, one extending upwardly and the other extending downwardly from the front face of such a unit. These conventional mounting straps 48 are secured to outlet box 10 by the provision of upper and lower tapped holes 50 and 52 in upper rear boss 24 and lower rear boss 28, respectively. Screws 54 pass through clearance holes in mounting straps 48 and thread into these holes 50 and 52.

The tightening of screws 54 serves a second function. The outer extremities of mounting straps 48 are conventionally broadened into a somewhat T-shape, so that they will bear upon upper and lower front bosses 22 and 26, respectively. Thus, tightening of screws 54 functions to clamp or squeeze together the respective front and rear bosses against wall panel 36. This permanently anchors outlet box 10 within the wall panel.

Screws 54 serve still a third function, best shown in FIG. 8. The shank of the screws function to eliminate a substantial portion of the vertical play which exists between the top and bottom walls of the box and the upper and lower edges of the wall opening, thus further assuring that the outlet box will not be unintentionally removed from the wall.

As shown in FIG. 8, mounting straps 48 are provided with a pair of threaded holes 56, which may serve as the anchoring point for the face plate which conventionally covers the completed installation.

Figure 3:
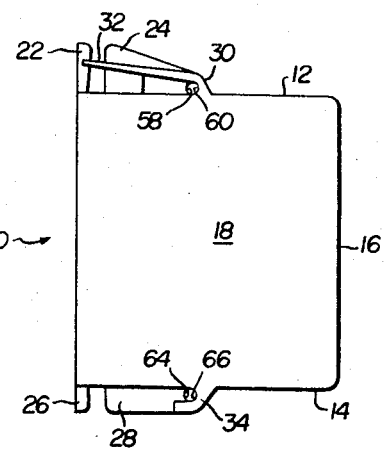
FIG. 3 is a side view of the box.
Figure 4:
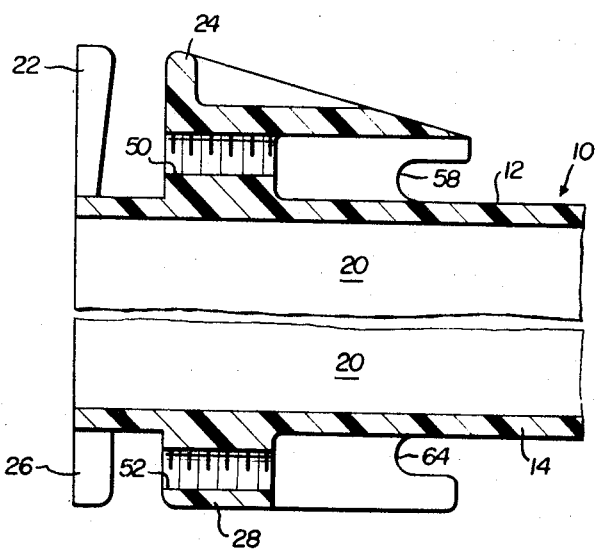
FIG. 4 is a side cross-sectional view in the direction of arrows 4—4 of FIG. 2.

Referring in particular to FIGS. 1 and 3 of the drawings, the provision for a supplementary lateral anchoring nail will now be explained. Some local building codes require that the outlet box be nailed to an adjacent stud. For this purpose, top wall 12 has a series of three nail guiding grooves. A first of these 58, is a semi-cylindrical groove in the rear portion of rear boss 24. Two additional semi-cylindrical grooves 60 are formed in side bosses 30. Together these are sufficient to anchor a nail along axis 62 of FIG. 1, since in combination the three grooves restrain a nail against any lateral movement while still being simple to mold.

Similarly, bottom wall 14 of box 10 is provided with a central semi-cylindrical nail groove 64 on the rear of rear boss 28, and with a further pair of oppositely directed semi-cylindrical side grooves 66 on bosses 34. These three grooves cooperate to provide an anchoring means for a lower lateral nail along axis 68 shown in FIG. 1.

It is to be emphasized that the provision for anchoring nails described above is only for compliance with certain local building codes, and is not essential to the secure anchoring of box 10 within a wall opening.

The particular dimensions referred to above are included merely to show exemplary relationships or relative sizes between the outlet box and the wall opening, it being understood that only the degree of play and interference between the various elements is significant. Similarly, while the mounting bosses have been described as located on the top and bottom walls of the outlet box, they could be mounted on any opposed pair of walls, the principle of operation being the same. As illustrated and described, however, gravity aids spring arms 32 in maintaining the position of FIG. 7. The number of mounting bosses is also subject to variation, it being essential only that there be some restraining member to engage both front and rear faces of the wall panel at opposed sides of the outlet box.

This invention may be further developed within the scope of the following claims. Accordingly, the above specification is to be interpreted as illustrative of only a single operative embodiment of this invention, rather than in a strictly limited sense.

I now claim:

1. An open front molded plastic electrical outlet box adapted to be mounted in a wall panel opening, comprising:
    at least one pair of parallel opposed side walls;
    each side wall of said pair having at least two outwardly projecting mounting bosses spaced rearwardly of each other, enough to snugly receive the wall panel therebetween, the distance between the outer end of the corresponding mounting bosses of said opposed side walls being greater than the corresponding dimension of the wall panel opening, whereby the bosses of each of said side walls are adapted to overlap the adjacent wall panel edges when the box is installed therein to normally prevent unintentional removal of the box therefrom;
    the box and mounting bosses being so dimensioned relative to each other that a first dimension measured from the outside of the first of said side walls to the outer end of a mounting boss on the other of said side walls is greater than a second corresponding dimension measured from the outside of said other side wall to the outer end of a mounting boss on said first side wall, while the corresponding dimension of the wall panel opening in which the box is adapted to be installed lies intermediate said first and second dimension;
    whereby insertion or removal of the box from the wall panel opening is possible only when the portion of said other side wall between the mounting bosses thereon is brought substantially into contact with the adjacent edge of the wall panel opening to permit the mounting boss of said first side wall to clear the adjacent edge of the wall opening.

2. The outlet box of claim 1, wherein the rearward mounting boss of each side wall of said pair has a forwardly exposed threaded hole for receiving the shank of the screw to be threaded rearwardly therein after the outlet box is mounted in the wall opening, said threaded holes being so placed to align with the mounting strap screw holes of conventional electrical units to be mounted within the outlet box;
    whereby a single pair of screws functions to simultaneously secure an electrical unit within the outlet box and to firmly secure the outlet box in the wall panel, the head of the screws bearing upon and pressing the mounting straps rearwardly against the forward mounting bosses as such screws are threaded into the rearward mounting bosses to thereby clamp the wall panel between the mounting bosses, the shank of such screws lying between the adjacent side walls of the box and wall panel opening edges to reduce the play therebetween.

3. The outlet box of claim 1 wherein said other side wall has mounted thereon outwardly biased resilient means positioned to engage the adjacent edge of the wall panel opening to normally bias the outlet box toward the wall opening edge adjacent said first side wall, thereby to aid in preventing unintentional removal of the outlet box of the wall panel.

4. The outlet box of claim 1 which is intended to be mounted in a vertical wall panel opening, and wherein said first side wall of the outlet box is its bottom wall and said other side wall of the outlet box is its top wall.

5. The outlet box of claim 4 wherein the rearward mounting bosses each have transverse nail-receiving passages and wherein said bottom and top walls of the box each have additional bosses carrying nail-receiving passages so positioned that the nail-receiving passages of both the bottom and top walls are laterally aligned to receive a nail driven laterally through such bosses to secure the outlet box to a stud alongside the outlet box.

6. The outlet box of claim 1, wherein the mounting bosses of each side wall comprise two laterally spaced forward mounting bosses and a rearward mounting boss located between but behind said two forward mounting bosses.

7. An open front molded plastic electrical outlet box adapted to be mounted in a vertical wall panel opening, comprising:
    a top wall and a bottom wall;

each of said walls having two forwardly located laterally spaced and outwardly projecting mounting bosses and a rearward outwardly projecting mounting boss located between said forward mounting bosses but spaced rearwardly therefrom enough to snugly receive the wall panel therebetween, the vertical distance between the outsides of said top and bottom walls being less than the vertical length of the wall panel opening, the vertical distance between the outer ends of said top and bottom mounting bosses being greater than the vertical length of the wall panel opening, whereby said bosses are adapted to overlap the adjacent wall panel edges when the outlet box is installed therein to normally prevent unintentional removal of the outlet box therefrom;

the outwardly projecting length of said top mounting bosses being greater than that of said bottom mounting bosses and the vertical distance between the outside of said top wall and the outer or bottom ends of said bottom mounting bosses being slightly less than the vertical length of the wall panel opening to permit insertion for removal of the outlet box from the wall panel opening only when the portion of said top wall between the mounting bosses thereon is brought substantially into contact with the upper edge of the wall panel opening to permit the bottom mounting bosses to clear the lower edge of the wall panel openings;

each of said rearward mounting bosses having a forwardly exposed threaded hole so positioned to receive the shank of the screw to be threaded rearwardly through the mounting straps of a conventional electrical unit to be placed within the outlet box after the outlet box is installed in the wall panel opening;

whereby a single pair of screws function to simultaneously secure an electrical unit within the outlet box and to firmly secure the outlet box in the wall panel, the head of the screws bearing upon and pressing the mounting straps rearwardly against the forward mounting bosses to thereby clamp the wall panel between the mounting bosses, the shanks of such screws lying between the top and bottom walls of the box and the respective adjacent edges of the wall panel opening to reduce the vertical play therebetween.

8. The outlet box of claim 7 wherein said top wall has mounted thereon outwardly biased resilient means positioned to engage the upper edge of the wall opening to normally bias the outlet box downward against the lower edge of the wall opening, thereby to aid in preventing unintentional removal of the outlet box from the wall panel.

* * * * *